Aug. 5, 1969 R. E. MILLER 3,459,175
MEDICAL DEVICE FOR CONTROL OF ENEMATA
Filed April 8, 1966 3 Sheets-Sheet 1
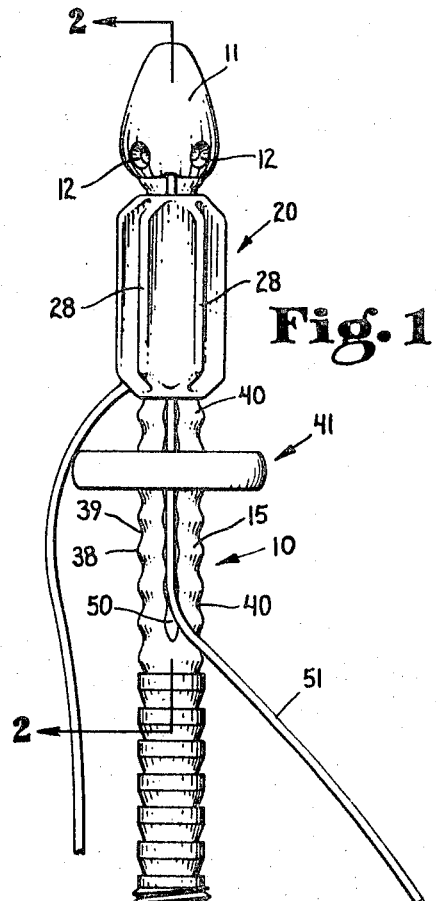
Fig. 1.
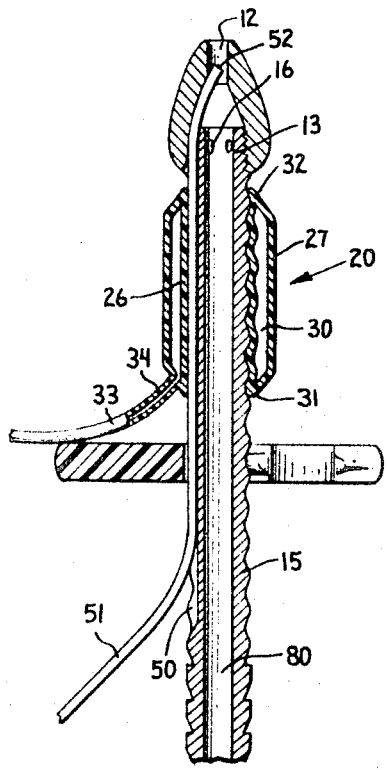
Fig. 2.
Fig. 3.
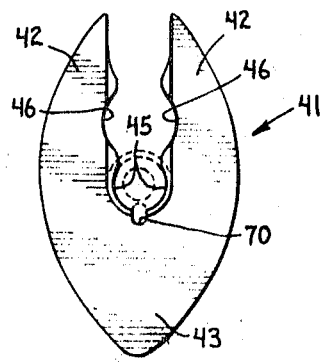
Fig. 4.
INVENTOR
ROSCOE E. MILLER
BY
Woodard, Weikart, Emhardt & Naughton
Attorneys

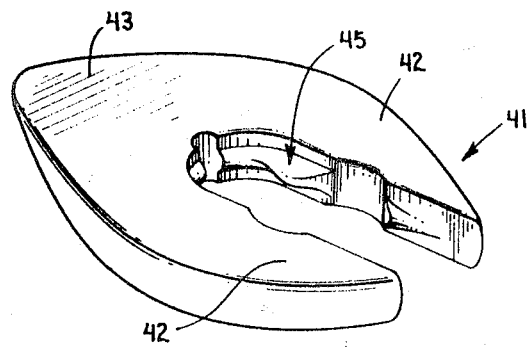
Fig. 5.
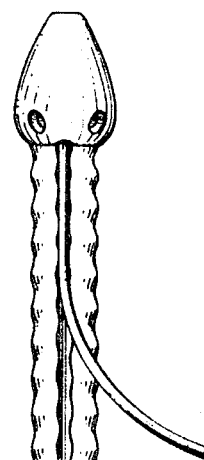
Fig. 6.
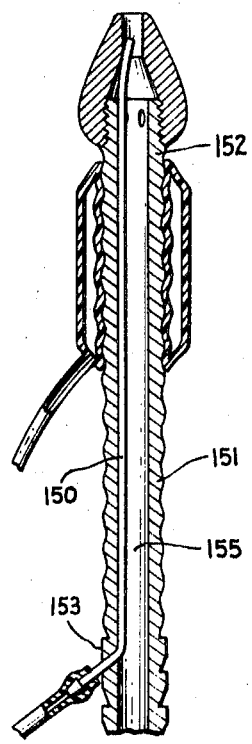
Fig. 7.
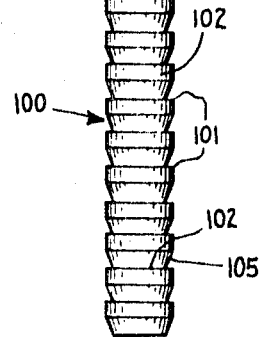
INVENTOR.
ROSCOE E. MILLER Aug. 5, 1969  R. E. MILLER  3,459,175
MEDICAL DEVICE FOR CONTROL OF ENEMATA
Filed April 8, 1966  3 Sheets-Sheet 3

INVENTOR.
ROSCOE E. MILLER
BY Woodard, Weikart, Emhardt & Naughton
Attorneys

United States Patent Office 3,459,175
Patented Aug. 5, 1969

3,459,175
MEDICAL DEVICE FOR CONTROL
OF ENEMATA
Roscoe E. Miller, 7400 W. 88th St.,
Indianapolis, Ind. 46278
Continuation-in-part of application Ser. No. 316,695,
Oct. 16, 1963. This application Apr. 8, 1966, Ser.
No. 541,285
Int. Cl. A61m 3/00, 5/18, 7/00, 9/00
U.S. Cl. 128—2        3 Claims

ABSTRACT OF THE DISCLOSURE

A device for giving enemata including an inflatable balloon received on a pipe having an undulating outer shape. An additional balloon may be used on the pipe at a location spaced longitudinally of the first balloon. An abutment element may be provided which is mountable on said undulations and is positionable against the patient's anus for blocking flow of fluid out of the patient's bowel.

---

Cross references to related applications

This application is a continuation-in-part of my copending application Ser. No. 316,695 filed Oct. 16, 1963, now abandoned.

The present invention relates to a device for giving enemata.

It is known in the art to control a rectal injection by means of a balloon which is inflated after the balloon carrying clyster tip has been inserted whereby the balloon expands in the anal canal. The clyster tip is retained within the anal canal by engagement of the balloon with the distal end portion of the anal canal which is of reduced size owing to the anal sphincter muscles. Frequently an enema is given to place barium solution in the colon for the taking of X-rays. In carrying out such a procedure, it is necessary that the barium solution remain in the colon during the taking of the X-rays. Consequently, one object of the present invention is to provide a device for the giving of enemata which is operable to prevent premature expulsion of the barium or other contrast fluid and which incorporates means for assisting in the interpretation of X-rays.

In certain cases for X-ray purposes it is desired to add air to the barium so that the colon contains a mixture of air and barium. In other cases it is desired to remove the barium solution from the colon and to replace it with air. Presently available devices for accomplishing these purposes are not entirely satisfactory. For example, certain existing devices cannot be operated to place air in the colon without also blowing barium into the colon. Also, certain existing devices for placing barium in the colon must be removed from the rectum prior to the placing of air in the colon. Consequently further objects of this invention are to provide a device for the giving of enemata which provides precise control of the placing of air and barium in the colon and which does not blow barium into the colon; to provide a device for the giving of enemata which is operable to conduct first barium and then air into the patient's bowel after withdrawal of the barium without removal of the device from the patient's rectum.

Still further objects of the present invention are to provide a device for the control of enemata which does not irritate hemorrhoids and to provide a device for the control of enemata which is cleaner and more convenient in use for the nurse or other person operating the device and administering the enema.

Related objects and advantages will become apparent as the description proceeds.

One embodiment of the present invention might include a hollow pipe adapted to be inserted by its forward end through the anal canal into the lower region of a patient's bowel and being adapted to connect by its rear end with an enema tube, an inflatable annular element of resilient flexible material received upon and surrounding said hollow pipe, said annular element including an inner generally tubular portion and a balloonable outer portion connected to said inner portion at the opposite ends thereof, said pipe having along its length an outer shape which repeatedly increases and decreases in size and in which a configuration of the outer shape is identically repeated a plurality of times along the length whereby the length of a single one of said configurations serves as a standard unit of length in an X-ray and whereby the patient can grip with the sphincter muscles the outer shape of the pipe to prevent expulsion from the anus.

The full nature of the invention will be understood from the accompanying drawings and the following description and claims.

FIG. 1 is a side elevation of one embodiment of the present invention.

FIG. 2 is a longitudinal section of the apparatus of FIG. 1 taken along the line 2—2 in the direction of the arrows.

FIG. 3 is a reduced size view similar to FIG. 1 of the device of FIG. 1 but showing the device in operation.

FIG. 4 is a plan view of an abutment element forming a part of the structure of FIGS. 1–3.

FIG. 5 is a perspective view of the abutment element of FIG. 4.

FIG. 6 is a side elevation of an alternative embodiment of the present invention.

FIG. 7 is a side elevation of still another alternative embodiment of the present invention.

Figure 8:
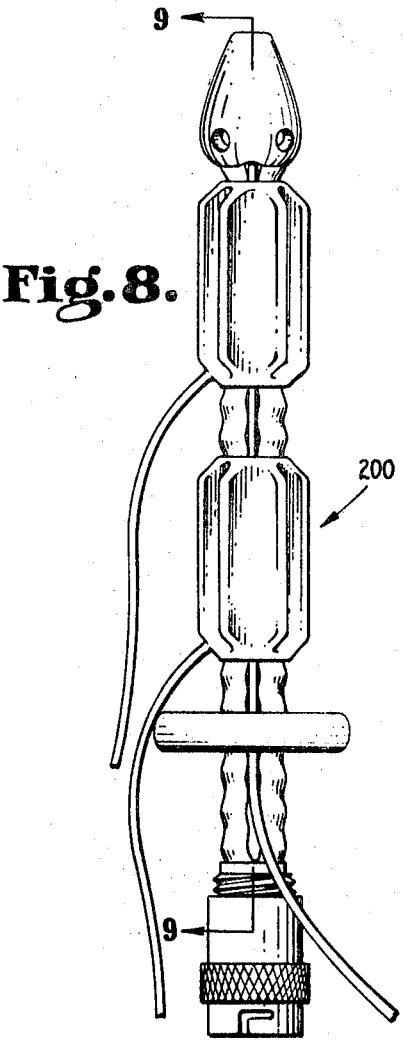
FIG. 8 is a side elevation of still a further alternative embodiment of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to FIGS. 1–5, there is illustrated a clyster tip 10 having an enlarged head 11 threadedly secured to the distal end 13 thereof. The head 11 is provided with suitable large apertures or bores or passages or openings 12 for permitting flow of fluid such as barium or the like through a rigid pipe 15 and out the passages 12. It will be noted that suitable apertures 16 are formed in the pipe 15 at the distal end 13 thereof and are located so that they are lined up with the rearward passages 12 in the head 11 when the head is tightly screwed onto the pipe 15. Alternatively, passages 12 may be suitably formed and located so that the apertures 16 are not needed and the passages 12 open in the head 11 forwardly of the pipe.

The proximal end 14 of the pipe 15 is connected to a conventional rubber or the like supply hose (not shown) which leads from a conventional enema fluid container. The connection of the supply hose and pipe is made by a bayonet type mechanism 17.

Received upon the pipe 15 is an annular element 20 formed of resilient flexible material. The annular element 20 includes an inner portion 26 which is tubular in shape and has generally the same internal diameter as the outside of the pipe 15. The outer portion 27 of the annular element 20 is fluted with ridges or flutes 28 which extend longitudinally of the element 20 and axially thereof. It will be noted that the inner and outer portions 26 and 27 define therebetween an annular passage 30. The inner and outer portions can be manufactured from a single tubular piece of rubber or the like by folding the piece at 31 and fusing it together at 32, thus forming the passage 30. An air duct 33 is connected to the annular member 20 and has a passage 34 in communication with the passage 30. The air duct 33 is of relatively small diameter in comparison to the diameter of the rigid pipe 15. Also, the air duct 33 is composed of the same flexible resilient material as the annular element 20.

The forward portion of the rigid pipe 15 is formed at its external surface with undulations 40. These undulations are regular in nature and have a cross sectional configuration approaching the shape of a sine wave. In other words, the external shape of the forward portion of the rigid pipe 15 increases and decreases in diameter uniformly at repeated intervals along the length of the forward portion of the pipe to include ridges 38 and valleys 39. The purpose of the undulations 40 is to provide means for mounting a resilient plastic abutment element 41 and also to provide a means which can be held by the sphincter muscles of the anus to prevent expulsion of fluid from the bowel. Of course, some patients do not have sufficient control over their sphincter muscles so that further mechanism such as the abutment element 41 are necessary to prevent expulsion of fluid from the bowel.

Referring to FIGS. 4 and 5, the details of the abutment element 41 are disclosed. It can be seen that the abutment element 41 has a U-shape which includes the legs 42 and the base 43. The abutment element 41 is formed of resilient material so that when it is received upon the pipe 15 in the manner shown in FIGS. 1 and 2, the surfaces 45 are firmly engaged in one of the valleys 39 between a pair of the ridges 38 and also against said pair of ridges. It will be noted from FIGS. 4 and 5 that the surfaces 45 have a complementary shape to the undulations.

Abutment element 41 is also provided with surfaces 46 which are spaced farther apart than the surfaces 45 and which permit the U-shaped abutment element to be moved longitudinally of the pipe 15 in such a manner that the surfaces 46 do not engage the undulations 40. It will also be noted that the external shape of the abutment element 41 is elliptical so that it better fits the space between the buttocks when in use. It can be appreciated from FIG. 3 that the purpose of the abutment element 41 is to pull up the inflated annular element 20 against the anus whereby the member 20 prevents flow of fluid from the bowel.

The rigid pipe 15 has a groove 50 formed in its outside surface. The groove 50 extends longitudinally of the pipe and is deeper than the valleys 39 as well as the ridges 38. Received within the groove 50 is a tube 51. The tube 51 extends through the groove 50 into the head 11 and terminates adjacent the most forward opening 12 in the head. Thus, some of the openings 12 are located rearwardly of the termination 52 of the tube 51 while one of the openings, the centermost opening, is located forwardly of the termination of the tube 51.

Referring to FIG. 3, the operation of the present device is illustrated. As shown in that figure, the clyster tip 10 is inserted into the bowel through the anal canal. The annular element 20 is filled with air by suitable operation of the syringe 60 and the valve 61. A clamping means 62 is then placed upon the tube 33 to retain the air within the annular element 20. As shown in FIG. 3, the expanded or ballooned annular element 20 blocks flow from the bowel 65 through the anus 66. Also, the ballooned element 20 retains the clyster tip 10 in the anus and bowel. The annular element 20 is formed of material such as rubber which is of sufficient frictional capability to firmly grip the pipe 15. Of course, the inflation of the annular element effects pressure of the annular element against the pipe to cause gripping by friction. Also, the undulations 40 assist in this gripping. It should also be mentioned that the annular element 20 can be caused to firmly grip the pipe for inserting the pipe and element 20 into the anus and bowel. Such gripping is accomplished by withdrawing all the air from the element 20 through duct 33 with the syringe 60.

As mentioned above, the patient's sphincter muscles may be sufficiently strong to grip the undulations 40 to hold the clyster tip in place. On the other hand, the abutment element 41 can be used as illustrated in FIG. 3 to seat the inflated element 20 against the anus by the nurse drawing the abutment element up against the anus with the pipe 15 between the surfaces 46 and then pushing the abutment element into the position shown in dotted lines in FIG. 4 with the clamping surfaces 45 engaging a suitable valley between the ridges of the undulations. It will be noted that the resilient abutment element 41 is provided with a groove 70 for the tube 51.

After the clyster tip has been placed in position in the manner shown in FIG. 3, the syringe 75 in combination with the valve 76 can be used to move air under pressure through the tube 51 into the bowel 65. Clamping means 77 is operable to retain this air in the bowel and also to prevent barium from flowing up the tube 51 into the syringe. Of course, barium in any desired amount can be supplied through the hollow interior 80 of the tube 15 to the bowel 65. Because of the fact that the termination 52 of the tube 51 is located between the forward and rearward exit openings 12 of the barium, the injecting of air through the tube 51 does not cause further barium to be forced into the bowel. Also, the bowel can be drained of barium through the hollow center 80 of the pipe 15 and air can be placed in the bowel without removing the clyster tip 10 from the bowel.

Referring now to FIG. 6, an alternative embodiment of the invention is illustrated which is identical to the embodiment shown in FIGS. 1–3 but which does not incorporate the bayonet connecting mechanism 17. Instead, the device of FIG. 6 is provided with a configuration 100 toward its proximal end which has sharp or right angle corners 101 and radially extending surfaces 102 operating to engage the inside surface of a rubber tube to mount the device of FIG. 6 in the tube. The device of FIG. 6 is easily inserted into the tube because the surfaces 105 facing toward the proximal end are tapered out to the maximum diameter of the configuration 100, thus providing no sharp edges to interfere with the insertion of the device of FIG. 6 into the rubber tube.

Referring to FIG. 7, an alternative embodiment of the invention is illustrated which is identical to the embodiment of FIGS. 1–3 excepting the manner in which the air providing tube 150 is mounted in the rigid pipe 151. As shown in FIG. 7, the tube 150 extends through the wall of the pipe 151 at a location 153 removed from the forward end 152 of the pile. The device of FIG. 7 is not as efficient in providing barium to the patient as is the device of FIGS. 1–3 because the hollow interior 155 of the pipe 151 is made smaller by the tube 150. This is not so of the tube 51 in FIG. 2. Because of the fact that the barium used is a fairly heavy viscous material, it is desirable that the opening 155 or 80 is large as possible and as free from obstructions as possible in order to facilitate the placing of the barium in the bowel.

Figure 9:
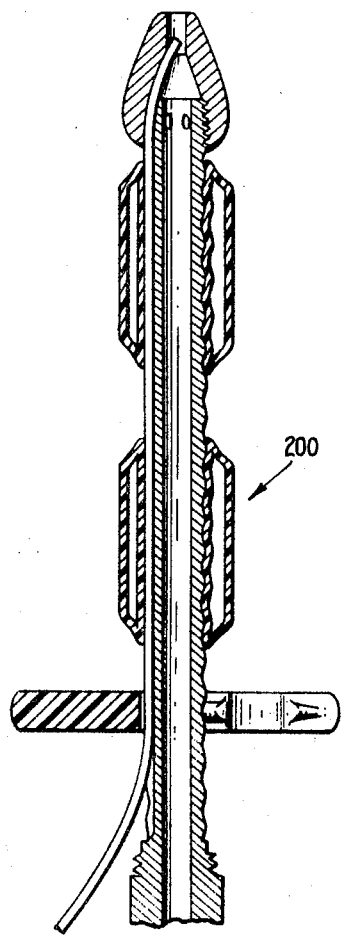
FIG. 9 is a section taken along the line 9—9 of FIG. 8 in the direction of the arrows.
Figure 10:
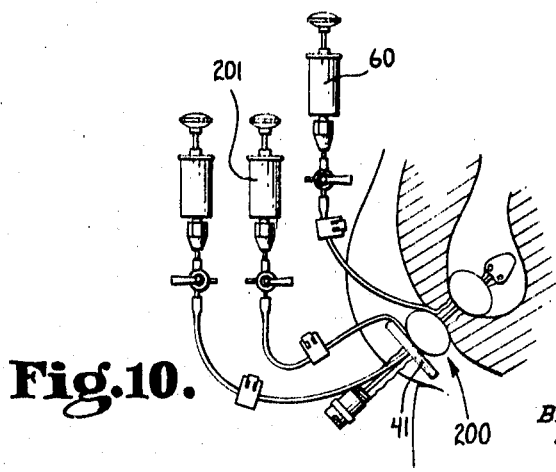
FIG. 10 is a reduced view of the device shown in FIG. 8 but showing the device in operation.

Referring now to FIGS. 8, 9 and 10, there is illustrated still a further embodiment of the invention which is identical to the embodiment of FIGS. 1–3 except that the embodiment of FIGS. 8, 9 and 10 incorporates an additional annular element 200. The additional annular element is constructed identically to the annular element 20. The additional annular element 200 is inflated by a syringe 201 in similar fashion to the inflation of the annular element 20 by the syringe 60. In operation, the annular element 200, however, is located externally of the bowel and anus as shown in FIG. 10.

The annular element 200 replaces a portion of the function of the abutment element 41 as shown in FIG. 3. In other words, the annular element 200 together with the annular element 20 seals the anal outlet of the bowel preventing expulsion of fluid. As shown, the annular element 200 is backed up by the abutment element 41. Because of the fact that the annular element 200 is soft and flexible, it is more comfortable to the patient and it does not irritate any hemorrhoids which the patient may have. Also, the annular element is much cleaner for a nurse to use than is the abutment element 41 alone.

For the above reasons, it can be appreciated that the present invention provides a device for the giving of enemata which is operable to prevent premature expulsion of the barium or other contrast fluid and which incorporates means for assisting in the interpretation of X-rays.

An additional function of the undulations 40 is to assist in the interpretation of X-rays. Frequently it is desirable when interpreting an X-ray to know the scale of the X-ray. Obviously the scale thereof can vary. By making the undulations a standard length, such as for example one centimeter, the radiologist is automatically provided with a standard unit of length in the X-ray which he can use in interpreting the X-ray.

It will be evident from the above description that the device of the present invention permits precise control of the placing of barium in the colon. Thus the flowing of air into the colon does not force a substantial amount of additional barium into the colon nor does the flowing of barium into the colon force a substantial amount of additional air into the colon. Also, barium can be withdrawn from the colon through the pipe 15 and air flowed into the colon without removing the clyster tip from the colon.

The invention claimed is:

1. A device for the control of enemata comprising a hollow pipe adapted to be inserted by its forward end through the anal canal into the lower region of a patient's bowel and being adapted to connect by its rear end with an enema tube, an inflatable annular element of resilient flexible material received upon surrounding said hollow pipe, said annular element including an inner generally tubular portion and a balloonable outer portion connected to said inner portion at the opposite ends thereof, means for filling said annular element with gaseous fluid, said pipe having along its length an undulating outer shape which repeatedly increases and decreases in size and in which a configuration of the outer shape is identically repeated a plurality of times along said length whereby the length of a single one of said configurations serves as a standard unit of length in an X-ray and the patient can grip the outer shape of the pipe with the anus muscles to prevent expulsion from the anus, said pipe having a groove in its outer shape extending along the length of said pipe, a head threadedly received on the forward end of said pipe, a tube received within said groove and extending into and terminating in said head, said tube extending between said inflatable element and said pipe, said groove being of sufficient depth so that inflating of said inflatable element does not close off flow through said tube, said tube being adapted to be connected to a source of air under pressure, said head having a plurality of exit apertures therein for permitting flow out of said pipe, at least one of said exit apertures being located to the rear of said tube termination.

2. A device for the control of enemata comprising a hollow pipe adapted to be inserted by its forward end through the anal canal into the lower region of a patient's bowel and be adapted to connect by its rear end with an enema tube, an inflatable annular element of resilient flexible material received upon and surrounding said hollow pipe, said annular element including an inner generally tubular portion and a balloonable outer portion connected to said inner portion at the opposite ends thereof, means for filling said annular element with gaseous fluid, said pipe having along its length an undulating outer shape which repeatedly increases and decreases in size and in which a configuration of the outer shape is identically repeated a plurality of times along said length whereby the length of a single one of said configurations serves as a standard unit of length in an X-ray and the patient can grip the outer shape of the pipe with the anus muscles to prevent expulsion from the anus, an abutment element adapted to be drawn up against the patient's anus for blocking flow of fluid out of the patient's bowel, said element having a U-shape straddling said pipe, said pipe's undulating outer shape engaging the legs of the U-shape to prevent said abutment element from moving longitudinally on said pipe, and U-shape element being formed of resilient material and including between the legs of said U-shape a pair of gripping surfaces and also a pair of surfaces which are sufficiently spaced to permit said U-shaped member to be moved longitudinally of said pipe without said pipe engaging said undulating outer shape.

3. A device for the control of enemata comprising a hollow pipe adapted to be inserted by its forward end through the anal canal into the lower region of a patient's bowel and being adapted to connect by its rear end with an enema tube, a head threadedly received on the forward end of said pipe, said pipe having a groove in its outer shape extending along the length of said pipe, and a tube received within said groove and extending into and terminating in said head, said head having a plurality of exit apertures therein for permitting flow out of said pipe, at least one of said exit apertures being located to the rear of said tube termination.

References Cited

UNITED STATES PATENTS

| | | | |
|---|---|---|---|
| 388,510 | 8/1888 | Terrell | 128—246 XR |
| 1,598,284 | 8/1926 | Kinney | 128—350 |
| 2,330,399 | 9/1943 | Winder | 128—349 |
| 2,494,088 | 1/1950 | Dulity | 128—240 |
| 2,564,809 | 8/1951 | Levene | 128—240 |
| 2,568,566 | 9/1951 | Sokolik | 128—240 |
| 2,687,131 | 8/1954 | Raiche | 128—349 |
| 2,883,986 | 4/1959 | De Luca et al. | 128—351 |
| 3,034,510 | 5/1962 | Kittel | 128—349 |
| 3,046,988 | 7/1962 | Moreau et al. | 128—344 XR |
| 3,154,077 | 10/1964 | Cannon | 128—246 XR |

FOREIGN PATENTS

| | | |
|---|---|---|
| 676,943 | 12/1929 | France. |
| 284,769 | 6/1915 | Germany. |
| 444,819 | 5/1927 | Germany. |

RICHARD A. GAUDET, Primary Examiner

RONALD L. FRINKS, Assistant Examiner

U.S. Cl. X.R.

128—239, 246, 247, 344